UNITED STATES PATENT OFFICE.

LEON LILIENFELD, OF VIENNA, AUSTRIA, ASSIGNOR, BY MESNE ASSIGNMENTS, TO THE CHEMICAL FOUNDATION, INC., A CORPORATION OF DELAWARE.

ALKYL ETHER OF STARCHES AND SIMILAR CARBOHYDRATES AND METHOD OF PRODUCING THE SAME.

1,350,820.     Specification of Letters Patent.    Patented Aug. 24, 1920.

No Drawing.    Application filed February 16, 1914. Serial No. 818,974.

*To all whom it may concern:*

Be it known that I, LEON LILIENFELD, a subject of the Emperor of Austria, and residing at No. 1 Zeltgasse, Vienna VIII, Austria, have invented certain new and useful Improvements in Alkyl Ethers of Starches and Similar Carbohydrates and Methods of Producing the Same, of which the following is a specification.

The present invention relates to the manufacture of new derivatives of starch and certain other carbohydrates hereinafter referred to, which derivatives, in the case of starch being employed as the starting material, constitute alkyl ethers of starch, that is to say, compounds derived from starch by the substitution of one or several or all of the hydrogen atoms of the hydroxyl groups of starch by alkyl radicals. In other words the products of the present invention are starch, or similar carbohydrates, which have been partially or entirely alkylated.

In certain of the appended claims, the expression "a starch" is intended to cover any of the carbohydrates referred to in this specification, but excluding cellulose, since the production of alkyl ethers of cellulose is described and claimed in my U. S. Patent 1,188,376.

The invention consists in replacing the hydrogens of one or more hydroxyl groups of a carbohydrate or a carbohydrate derivative by alkyl radicals containing a plurality of carbon atoms, a particular example of which is found in the group $C_2H_5$ (ethyl).

The invention may be carried into effect for example by causing esters of inorganic acids to act upon carbohydrates or derivatives of carbohydrates in the presence of free basic substances or of basic substances combined with the carbohydrates. The reaction may also be carried out in the presence of catalytic dehydrating or condensing agents, such agents being hereinafter referred to as substances promoting the reaction.

The following raw or primary materials may be employed, namely: all carbohydrates (with the exception of cellulose) of the type $(C_6H_{10}O_5)_n$, and materials containing such carbohydrates, for instance starch of all kinds, starch-containing substances and materials, starchy fruits, starchy flours, soluble starch, amorphous and crystallized starch (amylo-dextrin), α and β amylan, dextrins of all kinds, inulin, geloses and the like (see *Beilstein's Handbuch d. organischen Chemie,* 1893, vol. I, pp. 1072 to 1100) and their derivatives (for instance esters of inorganic and organic acids and the like.) These substances taken collectively are hereinafter referred to generically under the term "a starch," said term being used in the appended claims to cover all carbohydrates other than cellulose, referred to in this specification.

The new process is carried into effect, for instance, by treating the carbohydrates referred to above, or their derivatives as above referred to, with alkyl salts of inorganic acids or other suitable alkyl esters in the presence of basic substances, and thereafter isolating the akyl ethers of the carbohydrates from the reaction mixture. Haloid esters (halogen-substituted alcohols), sulfuric acid esters or, in a word, suitable esters of inorganic acids generally, or other suitable esters may be caused to act upon the carbohydrates above referred to or their derivatives.

If the alkali-compounds or other metallic compounds, so far as such exist for instance compounds of the alkaline earth metals, ammonium, zinc, silver, lead and the like, with the carbohydrates, are employed as starting materials, then the basic substances are fixed to the carbohydrates from the beginning. In all other cases the basic substances are contained in a free state in the reaction mixture.

The process may also be carried out by adding to the products of the reaction a further quantity of free basic substances, for instance, alkalis, alkali metal alcoholates or the like, in addition to the basic substances existing in combination with the carbohydrates.

The desired amount of basic substances may be added to the reaction mixtures either at once at the beginning, or gradually during the reaction. They may be added in the undissolved state, or dissolved in suitable solvents.

The carbohydrates may be employed dissolved in suitable solvents, or undissolved.

It is preferred to employ as solvents, water or aqueous solutions of alkalis, ammonia, aqueous solutions of pyridin or the like. The reaction may also be carried out in an aqueous-alcoholic solution. Or the process may be commenced in an aqueous alkaline solution, and an organic solvent or diluent, for instance, an alcohol, benzene, toluene, xylene or other hydrocarbon, pyridin or the like added during the reaction either in one or in several portions.

The basic substance (for instance, caustic alkali, an alkali metal alcoholate, pyridin, ammonia or the like) may also be dissolved at the beginning in appropriate solvents or diluents (for instance alcohol).

If derivatives of starch or other carbohydrates which are soluble in organic solvents (esters and the like) are employed as the raw or primary materials, they may be dissolved in organic solvents (for instance, alcohol, pyridin or the like), and thus brought into the reaction.

The process may also be commenced with undissolved starch or its derivatives.

In all cases, in working with dissolved or with undissolved carbohydrates or their derivatives, the reaction may be carried out in the presence or in the absence of diluents or of solvents for the resulting alkyl ethers of starch (for instance, alcohol, benzene, pyridin and the like).

When, for instance, pyridin or similar bases are employed as solvents or diluents, they may also act as basic substances.

The inorganic alkyl salts may be added either in toto or gradually to the reaction mixtures.

The reaction may take place in an open vessel or in vessels provided with a reflux condenser or under pressure (for instance in digesters, autoclaves, pressure tubes and the like) or in a vacuum, or with exclusion of air by means of neutral gases.

In most cases the alkyl ether of starch may be preferably separated out from aqueous reaction mixtures by bringing the hot or warm reaction mixtures, diluted with water or undiluted and, when necessary, after previous neutralization or acidification, onto filters, filter presses, suction apparatus, percolating cloths, centrifugal apparatus, rotary filters or the like, and washing the precipitates thoroughly with hot water. If the resulting alkyl ethers of starch are insoluble in cold water they may be freed from the by-products of the reaction by washing with cold water. If the resulting alkyl ethers of starch are obtained in the dissolved state in the reaction mixture, as would be the case when the reaction has taken place in the presence of a solvent, for example alcohol or the like, they can be precipitated by the addition of hot or cold water or aqueous solutions of salts or other precipitants. In all cases they can be removed from the reaction mixtures by a suitable extracting agent in which they are soluble and the by-products of the reaction are insoluble. They can then be obtained either by precipitation by means of suitable precipitants or by driving off the solvent.

If necessary, the alkyl ethers of starch may be subjected to a purifying process, conveniently by re-dissolving them in a suitable solvent and after filtration or percolation, if such be necessary, precipitating the ethers by means of a suitable precipitant or they may be purified by distilling off said solvent, or by dialysis.

Since starch contains several alcoholic hydoxyl hydrogens, the new process permits of varying the number of the hydrogen atoms of the hydroxyl groups of starch which may be replaced by alkyl radicals. The number of the alkyl radicals introduced depends on the quantity of the alkylating agent employed and also on the conditions of working (temperature, nature and quantity of the basic substances, concentration of the reaction mixtures, etc.)

Alkyl ethers of starch containing several alkyl radicals may be produced by preparing alkyl ethers with a lower number of alkyl-radicals and then treating them further with alkylating agents.

The free hydroxyl-groups of the alkyl ethers of starch in which not all the hydrogen atoms of the hydroxyl groups of the starch are replaced by alkyl-radicals, have a natural tendency to form compounds with bases, and especially with metals, for instance, alkali-metals or their hydroxids. This is shown for instance by the fact that many alcohol-soluble alkyl ethers of starch in which some but not all of the hydrogen atoms of the hydroxyl groups of the starch, are replaced by alkyl radicals, yield precipitates when their alcoholic solutions are treated with an alcoholic solution of an alkali. This is due to the fact that although the free alkyl ethers of starch are soluble in alcohol, their compounds with alkalis are insoluble in alcohol. For this reason in the case of such alkyl ethers of starch it is advisable to liberate the hydroxyl group or groups by treating them with acids or acid salts. This may be done either by adding substances having an acid reaction to the reaction mixtures after the completion of the reaction or by separating out the basic compounds of the alkyl ethers of starch, and then subjecting them to the action of acids or acid salts.

It appears probable that in many cases mixtures of various alkyl ethers of starch are produced, instead of a single alkyl ether of starch. In these mixtures the substances may differ from each other, in that they may contain different alkyl radicals.

Mixed alkyl ethers of starch are produced by allowing two or more inorganic acid esters or other suitable esters (differing from one another as regards the alkyl radical) to act upon starch or its derivatives.

Such mixed alkyl ethers of starch may also be obtained by producing alkyl ethers of starch containing free hydroxyl groups, with one or more similar alkyl-radicals, and then treating them with alkylating agents containing other alkyl-radicals.

The new alkyl ethers of starch and similar carbohydrates as above referred to, possess an extremely great variety of properties according to the number and nature of the alkyl radicals linked, ether-fashion, with the carbohydrate molecule, and also according to the particular carbohydrate employed. Many are soluble in water; others are insoluble in water but soluble in a number of other solvents. The water-soluble carbohydrate ethers, which I have so far produced, have the characteristic feature that although they are soluble in cold water, they are insoluble or scarcely soluble in hot water, so that their aqueous solutions become coagulated or precipitated upon heating. Many of the water-insoluble carbohydrate ethers are soluble in a surprisingly large number of solvents.

They all have in common an extremely high degree of stability, neutrality and indifference. They withstand being heated to high temperatures with or without water and are very resistant to the action of hot solutions of alkalis and acids. They possess a greater stability than all simple and mixed esters of starch and similar carbohydrates and all hitherto described conversion-products and derivatives of starch or similar carbohydrates. Solutions, pastes and jellies produced from carbohydrate ethers give transparent clear layers or products, plastic bodies and masses or filaments which resist chemical and physical influences and are very hard.

All these advantages are further accompanied by the property of many alkyl ethers of starch of being readily and easily soluble in an almost unlimited number of solvents.

Finally the alkyl ethers of starch are distinguished by their relative uninflammability, or by their slight inflammability.

All those properties render the alkyl ethers of starch suitable for a very large number of uses. Above all, they are adapted to replace in the same or similar applications starch and its conversion products and derivatives and also in all cases where other binding agents, colloids and plastic masses have been used hitherto.

Owing to the very numerous solvents in which the alkyl ethers of starch are soluble, these compounds may be combined with a large number of softening and gelatinizing agents. The great number of solvents therefor provides also the possibility of combining alkyl ethers of starch with many other colloids and binding substances and plastic bodies with which starch and its hitherto known derivatives could not be combined. Since the number of suitable solvents is extremely large, it is possible to combine the water-soluble alkyl ethers of starch and the water-insoluble alkyl ethers of starch respectively with many water-soluble and water-insoluble colloids, binding substances, thickening agents, softening agents, plastic bodies, drying and non-drying oils, fats, balsams, adhesives, waxes, paraffins, resins, caoutchouc and guttapercha, etc. They may be worked together with starch itself and its hitherto known derivatives, that is to say its esters, etc.; they may also be worked together with all cellulose derivatives, such as viscose, cellulose hydrate, oxy-cellulose, ammonium cupric oxid cellulose, nitro-cellulose, formyl-cellulose, acetyl-cellulose, cellulose ethers, etc., since one and the same solvent (simple or mixed) may be used for said substances and for the various ethers of starch. The following uses may be mentioned by way of example:

As plastic masses, substitutes for resins or resinous substances, celluloid substitutes (alkyl ethers of starch, alone or mixed with other starch derivatives or mixed with camphor, phosphoric acid esters of phenols or other gelatinizing agents, or camphor substitutes or softening agents, or agents for imparting softness or elasticity) artificial filaments and threads, artificial animal hair, coatings, photographic articles, light-proof and waterproof packings or coverings therefor, photographic lacquers; lacquers, varnishes and paints for general purposes, insulating goods, slashings or dressings for spinning fibers, dressings for fabrics, leather, paper and the like, printing agents and compositions and thickening agents for the same, agents for fixing pigments, adhesives, cements, and glues and adhesive pastes, sizes for paper, etc.

The following are examples of the manner in which the process may be carried out, but the invention is not limited to these precise examples.

*Example No. I.*

100 parts by weight of starch are dissolved either in a. 400 parts by weight of a 10 per cent. solution of caustic soda, or in b. 900 parts by weight of a 10 per cent. solution of caustic soda.

To one of these solutions there are added 100 to 200 parts by weight of a 30 per cent. solution of caustic soda; the mixture is gently heated on the water bath, and 100 to 200 parts by weight of di-ethyl sulfate are added gradually or at once.

Then, if necessary, the entire mixture is heated for half an hour to two hours on the water bath, and the reaction mixture, after cooling, is rubbed up, stirred or kneaded with 300 to 600 parts by weight of powdered caustic soda or an equivalent amount of caustic potash.

After heating again 300 to 1200 parts by weight of di-ethyl sulfate are added gradually or in a few large portions at suitable intervals, whereupon the separation of the ethyl ether of starch takes place accompanied by a rise in temperature and frothing of the mass.

The reaction mixture, preferably after dilution with water, is either acidulated immediately with dilute mineral acid (sulfuric acid or hydrochloric acid), or is placed in the alkaline state upon a suitable filtering apparatus and the ethyl starch collected on the filtering apparatus washed thoroughly with hot or cold water. In the second case it is preferred to effect a subsequent treatment with an acid or an acid salt and again washing.

Since this ether of starch is insoluble in water, it may also be purified, for instance, by dissolving in alcohol and then (after filtering or without filtering) precipitating by means of water or a dilute acid solution and then again washing.

The resulting ether of starch is a white powder which is insoluble in hot or cold water, but is readily soluble in the following solvents:—alcohol, methyl-alcohol, glacial acetic acid, formic acid, anilin, pyridin, quinolin, picolin, di-chlorohydrin, epi-chlorohydrin and the like, nitro-benzene, methyl acetate, ethyl acetate, ethyl phthalate, ethyl sebacate, ethyl citrate, ethyl succinate, ethyl tartrate, amyl acetate, butyl acetate, ethyl benzoate, ethyl levulinate and the like, acetone, pentachlorethane, tetrachlor ethane, trichlorethylene, acetylene dichlorid, carbon tetrachlorid, chloroform or the like, benzene, toluene, xylene, nitrophenols, ortho-cresol or the like, naphthalene, toluidin, formanilid, acetanilid or the like, turpentine oil, camphor, castor oil, linseed oil, Chinese wood oil, olive oil or the like, vaseline oil, paraffin oil, naphtha (petroleum), vaseline (petroleum jelly), or the like, stearin, beeswax, Japan wax, lanolin, or the like, nitro-methane, phenyl-ether, tri-phenyl phosphate, tri-cresyl phosphate, etc.

According to Example No. I, the procedure consists in first producing a water-soluble ethyl starch by adding only a portion of the caustic soda and ethyl sulfate required for producing the water-insoluble ethyl ether of starch, and then treating the reaction mixture (containing this water-soluble ethyl starch) with further additions of caustic soda or caustic potash and ethyl sulfate for the purpose of converting the water-soluble ethyl ether of starch into a water-insoluble ether.

Instead of treating the water-soluble ethers in the reaction mixtures with the further additions of caustic soda and ethyl sulfate, it is obvious that the further addition of the basic substances and the ethyl sulfate to the water-soluble ethers may be effected after these have been separated from the reaction mixtures.

*Example No. II.*

100 parts by weight of starch are dissolved in 900 parts by weight of a 10 per cent. solution of caustic soda. The resulting solution is gently heated with 200 to 400 parts by weight of a 30 to 40 per cent. solution of caustic soda, and then 200 to 500 parts by weight of di-ethyl sulfate are gradually introduced in the mass. The precipitated ethyl ether of starch may either be immediately collected on a hot water filter, washed with hot water and then treated with an acid, or the whole reaction mixture may be acidified with dilute mineral acid, filtered and afterward washed.

The washed ethyl ether of starch is a white substance characterized by being soluble in cold water, but insoluble or scarcely soluble in hot water.

*Example No. III.*

100 parts by weight of starch are dissolved either in
 a. 400 parts by weight of a 10 per cent. solution of caustic soda or in
 b. 900 parts by weight of a 10 per cent. solution of caustic soda.

To one of these solutions there are then added 520 to 800 parts by weight of a 30 per cent. solution of caustic soda, and 1000 parts by weight of ethyl iodid, and the mixture is heated for a long period in a digester at 100 degrees centigrade or in a vessel provided with a reflux condenser on the water bath.

The ether is separated out in the same manner as described in Example I. It is a white powder which is insoluble in hot or cold water, but is readily soluble in alcohol, methyl-alcohol, dichlorhydrin, glacial acetic acid, tetrachlorethane and the like.

I make no claim to the methyl ethers of starches, but only to the ethers comprising alkyl groups which contain more than one carbonatom, which ethers are materially different, as regards solubilities in a number of solvents, from the methyl ethers.

The term "ether" has been heretofore incorrectly applied in connection with derivatives of carbohydrates, to refer to esters, such bodies as nitrated starch, having heretofore been referred to as starch ethers, or ethers of carbohydrates. The term "ether" throughout this specification is not used to refer to esters, but to bodies produced by the elimination of water from two alcoholic molecules, which is the only correct usage of the term "ether" in organic chemistry.

I claim:

1. The process of producing an ether of a starch, which comprises reacting upon a starch with an ester of an inorganic acid and an alkyl group containing a plurality of carbon atoms, in the presence of a basic substance.

2. A process of producing an ether of a starch, which comprises reacting upon a starch with an ester of an inorganic acid and an alkyl group containing a plurality of carbon atoms in the presence of a basic substance and in the presence of a suitable solvent.

3. A process of making an ether of a starch, which comprises first reacting upon a starch with an ester comprising an alkyl group containing a plurality of carbon atoms and an inorganic acid radical in the presence of an alkali, and secondly in isolating the formed alkyl ether of starch.

4. A process of making an alkyl ether of starch, which comprises dissolving starch in a solution of caustic alkali, and reacting thereupon with diethyl sulfate.

5. As a new article of manufacture, an ether of a starch with an alkyl group containing a plurality of carbon atoms.

6. As a new article of manufacture, an ethyl ether of starch.

7. The process of manufacturing new starch derivatives which are chemically ethyl ethers of starch which process consists in first treating starches with ethylating agents and secondly isolating the formed ethyl ethers of starch from the reaction mixture, substantially as described.

8. The process of manufacturing new starch derivatives which are chemically ethyl ethers of starch which process consists in first treating alkaline solutions of starches with suitable ethylating agents and secondly isolating the formed ethyl ethers of starch from the reaction mixture, substantially as described.

9. The process of manufacturing new starch derivatives which are chemically ethyl ethers of starch which process consists in first treating starches with basic substances and inorganic ethyl esters and secondly isolating the formed ethyl ethers of starch from the reaction mixture, substantially as described.

10. The process of manufacturing new starch derivatives which are chemically ethyl ethers of starch which process consists in first treating starch with a basic substance and with only a portion of the quantity of an inorganic ethyl ester which would be necessary to form a water-insoluble ethyl ether of starch thus forming a water-soluble ethyl ether of starch, secondly treating the reaction mixture containing the water-soluble ethyl ether of starch with a further quantity of a basic substance and with a further quantity of an inorganic ethyl ester to convert the ethyl ether of starch soluble in water into an ethyl ether of starch insoluble in water and finally isolating the formed ethyl ether of starch from the reaction mixture, substantially as described.

11. The process of manufacturing new starch derivatives which are chemically ethyl ethers of starch which process consists in first treating starches with alkalis and inorganic ethyl esters and secondly isolating the formed ethyl ethers of starch from the reaction mixture, substantially as described.

12. The process of manufacturing new starch derivatives which are chemically ethyl ethers of starch which process consists in first treating starch with an alkali and with only a portion of the quantity of an inorganic ethyl ester which would be necessary to form a water-insoluble ethyl ether of starch thus forming a water-soluble ethyl ether of starch, secondly treating the reaction mixture containing the water-soluble ethyl ether of starch with a further quantity of an alkali and with a further quantity of an inorganic ethyl ester to convert the ethyl ether of starch soluble in water into an ethyl ether of starch insoluble in water and finally isolating the formed ethyl ether of starch from the reaction mixture, substantially as described.

13. The process of manufacturing new starch derivatives which are chemically ethyl ethers of starch which process consists in first treating starches with alkalis and ethyl sulfate and secondly isolating the formed ethyl ethers of starch from the reaction mixture, substantially as described.

14. The process of manufacturing new starch derivatives which are chemically ethyl ethers of starch which process consists in first treating alkaline solutions of starch with inorganic ethyl esters and secondly isolating the formed ethyl ethers of starch from the reaction mixture, substantially as described.

15. The process of manufacturing new starch derivatives which are chemically ethyl ethers of starch which process consists in first treating alkaline solutions of starch with alkalis and inorganic ethyl esters and secondly isolating the formed ethyl ethers of starch from the reaction mixture, substantially as described.

16. The process of manufacturing new starch derivatives which are chemically ethyl ethers of starch which process consists in first treating alkaline solutions of starch with ethyl sulfate and secondly isolating the formed ethyl ethers of starch from the reaction mixture, substantially as described.

17. The process of manufacturing new starch derivatives which are chemically ethyl ethers of starch which process consists in first treating alkaline solutions of starch with alkalis and ethyl sulfate and secondly isolating the formed ethyl ethers of starch from the reaction mixture, substantially as described.

18. The process of manufacturing new starch derivatives which are chemically ethyl ethers of starch which process consists in first treating an alkaline solution of starch with only a portion of the quantity of ethyl sulfate which would be necessary to form a water-insoluble ethyl ether of starch, thus forming a water-soluble ethyl ether of starch, secondly treating the reaction mixture containing the water soluble ethyl ether of starch with a further quantity of a basic substance by adding caustic alkali and with a further quantity of ethyl sulfate to convert the ethyl ether of starch soluble in water into an ethyl ether of starch insoluble in water, and finally isolating the formed ethyl ether of starch from the reaction mixture, substantially as described.

19. The process of manufacturing new starch derivatives which are chemically ethyl ethers of starch which process consists in first treating an alkaline solution of starch with only a portion of the quantity of ethyl sulfate which would be necessary to form a water-insoluble ethyl ether of starch thus forming a water-soluble ethyl ether of starch, secondly treating the reaction mixture containing the water-soluble ethyl ether of starch with a further quantity of a basic substance by adding caustic alkali in solid form and with a further quantity of ethyl sulfate to convert the ethyl ether of starch soluble in water into an ethyl ether of starch insoluble in water and finally isolating the formed ethyl ether of starch from the reaction mixture, substantially as described.

20. As new products, ethyl ethers of starch which are practically insoluble in water and soluble in organic solvents.

21. As new products, ethyl ethers of starch which are soluble in some organic solvents.

22. As new products, alkyl ethers of a starch, in solid form, said ethers containing alkyl radicals containing a plurality of carbon atoms.

23. As new products, ethyl ethers of a starch in solid form.

24. As a new article of manufacture, an ether of a starch with an alkyl group containing a plurality of carbon atoms, said ether being insoluble in hot water.

25. As a new article of manufacture, an ethyl ether of starch, said ether being insoluble in hot water.

26. As new products, ethers of starch with alkyl radicals containing a plurality of carbon atoms, in the form of plastic celluloid-like masses, which may be obtained by evaporating the solutions of the said ethers of starch.

27. As new products, ethyl ethers of starch which are soluble in organic solvents, but practically insoluble in hot water.

28. As new products, ethyl ethers of starch which are soluble in organic solvents, but practically insoluble in hot water, in the form of plastic celluloid-like masses which may be obtained by evaporating the solutions of the said ethyl ethers of starch.

29. Alkyl ethers of starch which are insoluble in hot water.

30. As a new material, a solid product containing as its essential constituent, ethyl ethers of starch.

31. As a new material, a solid product, containing as its essential constituent, alkyl ethers of starch with alkyl radicals containing a plurality of carbon atoms.

32. A plastic mass comprising as an ingredient thereof, an alkyl ether of starch, having at least a portion of the hydroxyl hydrogens of the starch replaced by alkyl radicals each containing a plurality of carbon atoms.

33. A water-insoluble plastic mass comprising as an ingredient thereof, a alkyl ether of starch, having at least a portion of the hydroxyl hydrogens of the starch replaced by alkyl radicals each containing a plurality of carbon atoms.

34. A plastic mass containing as an essential constituent, an ethyl ether of starch.

35. A plastic mass containing as an essential constituent, an ethyl ether of starch which is practically insoluble in hot water.

36. The herein described new plastic substance containing as its essential constituent, a starch ether, that is a starch derivative in which at least one of the hydrogen atoms of the hydroxyl groups of the starch is replaced by an alkyl radical containing a plurality of carbon atoms, which ether is soluble in some organic solvents.

37. The herein described new plastic substance containing as its essential constituent, a starch ether, that is a starch derivative, in which at least one of the hydrogen atoms of the hydroxyl groups of the starch is replaced by an alkyl radical containing a plurality of carbon atoms, which ether is insoluble in water, but soluble in some organic solvents.

38. A starch ether in which several of the hydrogen atoms of the hydroxyl groups of a starch are replaced by alkyl radicals, at least one of which radicals is $C_2H_5$.

39. A plastic mass containing as an essential constituent, an ethyl ether of starch which is practically insoluble in hot water, but soluble in some organic solvents.

In testimony whereof I have signed my name to this specification in the presence of two subscribing witnesses.

Dr. LEON LILIENFELD.

Witnesses:
 HERMAN WUNDERLICH,
 AUGUST FUGGER.